US012589889B2

(12) United States Patent
Cocaud et al.

(10) Patent No.: US 12,589,889 B2
(45) Date of Patent: Mar. 31, 2026

(54) SIMULATION ARCHITECTURE FOR SAFETY TESTING OF AIRCRAFT MONITORING SOFTWARE

(71) Applicant: AΛ3 by Airbus, LLC, Sunnyvale, CA (US)

(72) Inventors: Cedric Cocaud, Sunnyvale, CA (US); Arne Stoschek, Palo Alto, CA (US); Alexander Dean Naiman, Santa Clara, CA (US); Sebastien Giuliano, Toulouse (FR); Jean-Jacques Toumazet, Toulouse (FR)

(73) Assignee: A'by Airbus, LLC, Sunnyvale, CA (US)

( * ) Notice: Subject to any disclaimer, the term of this patent is extended or adjusted under 35 U.S.C. 154(b) by 408 days.

(21) Appl. No.: 17/788,710

(22) PCT Filed: Dec. 23, 2019

(86) PCT No.: PCT/US2019/068376
§ 371 (c)(1),
(2) Date: Jun. 23, 2022

(87) PCT Pub. No.: WO2021/133378
PCT Pub. Date: Jul. 1, 2021

(65) Prior Publication Data
US 2023/0023544 A1 Jan. 26, 2023

(51) Int. Cl.
B64F 5/60 (2017.01)
B64D 47/00 (2006.01)
G08G 5/80 (2025.01)

(52) U.S. Cl.
CPC ................ B64F 5/60 (2017.01); B64D 47/00 (2013.01); G08G 5/80 (2025.01)

(58) Field of Classification Search
CPC .............. B64F 5/60; B64D 47/00; G08G 5/04
See application file for complete search history.

(56) References Cited

U.S. PATENT DOCUMENTS

| | | | | |
|---|---|---|---|---|
| 11,341,745 | B1 * | 5/2022 | McDowell | ............. G06N 3/047 |
| 2006/0126608 | A1 | 6/2006 | Pereira et al. | |

(Continued)

FOREIGN PATENT DOCUMENTS

| | | |
|---|---|---|
| CN | 108401449 A | 8/2018 |
| EP | 3566925 A1 | 11/2019 |

(Continued)

OTHER PUBLICATIONS

CN Office Action for Application No. 2019-80103266.X mailed Nov. 30, 2024, 24 pp. (w/ machine translation).

(Continued)

*Primary Examiner* — Naeem Taslim Alam
(74) *Attorney, Agent, or Firm* — NIXON PEABODY LLP

(57) ABSTRACT

A simulation testing architecture can be applied to an aircraft monitoring system for an aircraft that includes complex algorithms (such as machine learning algorithms) for sensing objects around the aircraft and controlling the aircraft to avoid such objects. A reference scenario is selected from a plurality of stored scenarios based on a desired set of aircraft safety standards. A stochastic process is applied to generate a large number of conditional variations within a simulated environment, varying weather, objects in the airspace, points of failure, and the like to provide a representative sample of possible aircraft missions and encounters within the selected reference scenario. Synthetic environmental inputs are fed into the aircraft monitoring system software, and the resultant actions of the software are logged. These logs can be used to generate metrics on an encounter-level basis, a scenario-level basis, or across a population of scenarios.

20 Claims, 5 Drawing Sheets

(56)          References Cited

U.S. PATENT DOCUMENTS

2014/0350780 A1     11/2014  Chai et al.
2017/0061813 A1*     3/2017  Tao ......................... G09B 9/08
2019/0004518 A1*     1/2019  Zhou ..................... G06N 3/092
2019/0009789 A1      1/2019  Zhang
2019/0033893 A1*     1/2019  Duan ..................... G05D 1/104
2020/0302026 A1*     9/2020  Restifo .................... G08G 5/26
2021/0065003 A1*     3/2021  Chen ...................... G06N 3/092
2021/0124352 A1*     4/2021  Candido .............. B64U 10/30

FOREIGN PATENT DOCUMENTS

WO          2016172009  A1     10/2016
WO          2019199880  A1     10/2019

OTHER PUBLICATIONS

CN Search Report for Application No. 2019-80103266.X mailed Nov. 30, 2024, 3 pp.
CN Office Action for Application No. 2019-80103266.X mailed May 27, 2025, 18 pp. (w/ machine translation).

* cited by examiner

SIMULATION ARCHITECTURE FOR SAFETY TESTING OF AIRCRAFT MONITORING SOFTWARE

BACKGROUND

Aircraft may encounter a variety of risks during flight, such as collision with other aircraft, equipment, buildings, birds, debris, terrain, and other objects. In a self-piloted aircraft, sensor data may be used to detect objects in the space around the aircraft that pose a collision risk or may otherwise cause damage or injury to an aircraft or its occupants. The detection, recognition, and/or avoidance of sensed objects may, in some instances, include one or more intelligent (e.g., autonomous) components capable of independently adapting to sensed data and determining a suitable path for the aircraft to follow in order to avoid colliding with the objects.

In order for an aircraft to be airworthy, it must contain systems capable of reliably detecting, assessing, and avoiding objects external to the aircraft, in any of a variety of environmental conditions. Demonstrating the reliability of such detection and avoidance can be challenging. To show such airworthiness, an aircraft's software and electronic hardware relating to safety operations (such as collision avoidance) may be shown to meet certain safety standards. In some cases, relevant safety standards are promulgated by the certification authorities, e.g., the Federal Aviation Administration (FAA), the European Union Aviation Safety Agency (EASA), the International Organization for Standardization (ISO), and/or other standards-setting organizations. However, due to the cost of executing flight sequences and the unpredictability of conditions that are encountered during flight, it may be overly burdensome to validate the ability of an aircraft to meet rigorous safety standards for collision avoidance through flight tests alone.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

In the figures, the left-most digit(s) of a reference number may identify the figure in which the reference number first appears. The use of the same reference numbers in different figures indicates similar or identical items or features. The drawings are not to scale.

DETAILED DESCRIPTION

Figure 1:
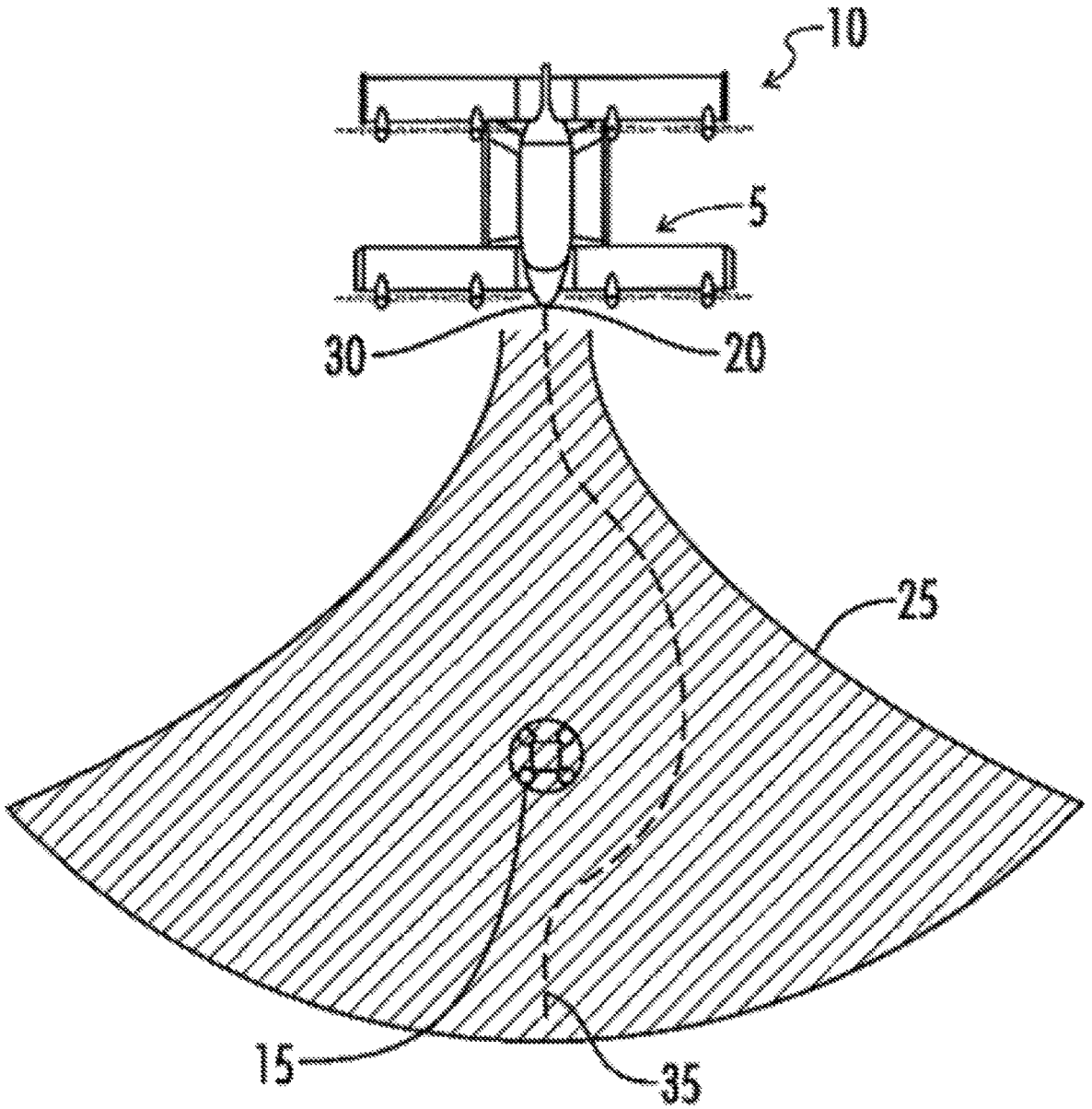
FIG. 1 is a diagram of a top perspective view of an aircraft having an aircraft monitoring system in accordance with some embodiments of the present disclosure.

The present disclosure generally pertains to architectures for simulating the execution of autonomous solutions for aircraft for detecting and avoiding external objects. The simulation may be performed in a stochastic (or partially stochastic) manner, such that a representative sample of airborne encounters can be simulated and the handling of such encounters assessed. The data from the encounters may be aggregated to generate metrics on an encounter-level and over a varied population of flight scenarios, to verify and validate the reliability of the detecting and avoiding solutions.

In some embodiments, a simulation system verifies and validates the actions of an aircraft including an aircraft monitoring system having sensors that are used to sense the presence of objects around the aircraft for collision avoidance, navigation, or other purposes. At least one of the sensors may be configured to sense objects within the sensor's field of view and provide sensor data indicative of the sensed objects. The aircraft includes one or more systems directed to the collection and interpretation of the sensor data to determine whether an object is a collision threat, providing a recommendation or advisory of an action to be taken by the aircraft to avoid collision with the sensed object, and controlling the aircraft to avoid collision if necessary. The detection, recognition, and/or avoidance of sensed objects may, in some instances, include one or more intelligent (e.g., autonomous) components capable of independently adapting to new data and previously-performed computations. Such components may not rely on explicitly programmed instructions, instead applying machine learning techniques to progressively generate modified, improved models and algorithms for perception and decision making.

In an exemplary embodiment, a simulation system is a flight testing safety simulation system that generates and/or stores a series of reference scenarios, representing one or more challenges (e.g., approaching objects, system failures) and/or one or more goals (e.g., land successfully, navigate to a given point, avoid a high number of threats at once) for the aircraft monitoring system and other aircraft system components to address. For each of the reference scenarios, the simulation system creates a plurality of conditional variations within the defined scenario challenges or goals. These conditional variations are randomized to include any combination of possible conditions, for instance, a number and/or type of approaching objects, kinematic conditions (e.g., speed/altitude/direction) of the aircraft or objects in the space around the aircraft, weather conditions, failure points within the aircraft or within supporting systems (e.g., communications systems), topological or geographic conditions, lighting/visibility/noise conditions, and the like. The system may generate, in an exemplary embodiment, hundreds or thousands of potential variations, referred to herein as encounters, each encounter represented by a series of vector inputs used to generate sensor data models. These sensor data models are input into the monitoring system of the aircraft and flight computing elements, and the resultant instructions for aircraft action are assessed and logged. Rather than the actual manipulation of physical aircraft components, the commands sent to those components are used by the simulation system to calculate updated positions (and relative positions) of the aircraft and surrounding objects. This data is then once again input into the aircraft monitoring system, in a cyclical pattern, until the challenges or goals of the scenario have been addressed or completed, regardless of success. Each of the randomized encounters is executed in turn, until all encounters are complete for a given reference scenario. In some embodiments, the simulation system may then proceed through the same iterative process for each of (or some subset of) the generated or stored reference scenarios.

Logged data (e.g., position data, timestamp data) regarding the execution of the simulated testing is collected and metrics may be derived therefrom at different levels of aggregation. Metrics may be collected on an encounter-level basis. Metrics may also be collected over the population of executed reference scenarios. These metrics may be used to compare the aircraft system's responses against one or more defined safety standards. In some embodiments, the safety standards may be defined or derived from risk factors set by regulatory authorities (such as the FAA, EASA, or ISO).

In conventional solutions for demonstrating safety aircraft safety, the aircraft may be required to physically undergo a series of tests. When an aircraft is flown in a real-world environment, the testers have little control over environmental or external factors, and may not be able to safely realize the variety or complexity of conditions that they may wish to test upon. With predefined decision-tree like software code, a formal analysis of code may be used to demonstrate the specific actions the aircraft may take. However, the perception and decision making tasks linked to the detect and avoid system are too complex to be solved by such simple software code and requires the use of more advanced approaches, such as those used by machine learning algorithms. Moreover, the number of potential cases addressable by the aircraft software is too vast to be addressed through conventional methods of testing. The cost of actually creating and operating an aircraft to cover a sufficient number of cases may be prohibitively expensive in time or resources.

Unlike conventional systems, through the systems and methods described herein, a simulation system can verify and validate the performance and safety of an aircraft monitoring system for detection, assessment, and avoidance. The entire software stack used in the aircraft monitoring system may be tested, and the proof of its execution and safety level may be generated through software executed testing for all or a plurality of randomly-generated conditions in a series of target representative scenarios, that is, through a stochastic process. In addition to proof of execution, proof of performance may be generated at various levels of testing, either at an encounter level, a scenario level, or across a plurality of scenarios. This performance can be compared to a desired set of safety and performance targets that conform to any appropriate regulatory standards. Additionally, the simulation systems described herein provide benefits above and beyond those that could be achieved through flight performance testing in actual or true to life environments, as the system may generate a huge variety of possible encounters, some being too unsafe to test outside of a simulation environment. The variations can be representative of virtually all encounters, and/or may be highly complex, so as to simulate "corner" cases, encounters or scenarios that are extremely unlikely to occur in real-life but with potentially severe consequences, allowing for testing that could not be done in an actual aircraft implementation.

FIG. 1 depicts a top-down perspective view of an aircraft 10 having an aircraft monitoring system 5 in accordance with some embodiments of the present disclosure. FIG. 1 depicts the aircraft 10 as an autonomous vertical takeoff and landing (VTOL) aircraft 10, however, the aircraft 10 may be any of various types. The aircraft 10 may be configured for carrying various types of payloads (e.g., passengers, cargo, etc.). In other embodiments, systems having similar functionality may be used with other types of vehicles 10, such as automobiles or watercraft. In the embodiment of FIG. 1, aircraft 10 is configured for self-piloted (e.g., autonomous) flight. As an example, aircraft 10 may fly autonomously, following a predetermined route to its destination under the supervision of a flight controller (not shown in FIG. 1) located on the aircraft 10 or communicably accessible with the aircraft 10. In other embodiments, the aircraft 10 may be configured to operate under remote control, such as by wireless (e.g., radio) communication with a remote pilot. Alternatively or additionally, the aircraft 10 may be a manned or partially manned/partially-autonomous vehicle.

Aircraft 10 has one or more sensors 20 of a first type for monitoring space around the aircraft, and one or more sensors 30 of a second type for sensing the same space and/or additional spaces. Any number of sensors, and any number of types of sensors may comprise the illustrated sensors 20, 30. These sensors may, in various embodiments, be any appropriate optical or non-optical sensor(s) for detecting the presence of objects, such as an electro-optical or infrared (EO/IR) sensor (e.g., a camera), a light detection and ranging (LIDAR) sensor, a radio detection and ranging (radar) sensor, transponders, inertial navigation systems and/or global navigation satellite system (INS/GNSS), or any other sensor type that may be appropriate. For example, a sensor may be configured to receive a broadcast signal (e.g., through Automatic Dependent Surveillance-Broadcast (ADS-B) technology) from an object indicating the object's flight path.

For ease of illustration, FIG. 1 only depicts sensors 20, 30 at the front of the aircraft 10, however, in a preferred embodiment, sensors 20, 30 may be located in various positions on the aircraft 10 and may have a full or partial field of view around the aircraft in all directions. The aircraft monitoring system 5 of FIG. 1 is configured to use the sensors 20, 30 to detect an object 15 that is within a certain vicinity of the aircraft 10, such as near a flight path of the aircraft 10. Such sensor data may then be processed to determine whether the object 15 presents a collision threat to the vehicle 10. In this regard, aircraft monitoring system 5 may be configured to determine information about the aircraft 10 and its route. The aircraft monitoring system 5 may, for example, determine a safe escape path for the aircraft 10 to follow that will avoid a collision with the object 15.

The object 15 may be of various types that aircraft 10 may encounter during flight, for example, another aircraft (e.g., a drone, airplane, or helicopter), a bird, debris, or terrain, or any other of various types of objects that may damage the aircraft 10, or impact its flight, if the aircraft 10 and the object 15 were to collide. The object 15 is depicted in FIG. 1 as a single object that has a specific size and shape, but it will be understood that object 15 may represent one or several objects that may take any of a variety of shapes or sizes and may have various characteristics (e.g., stationary or mobile, cooperative or uncooperative). In some instances, the object 15 may be intelligent, reactive, and/or highly maneuverable, such as another manned or unmanned aircraft in motion.

FIG. 1 further illustrates an exemplary process of how a detected object 15 may be avoided. The aircraft monitoring system 5 may use information about the aircraft 10, such as the current operating conditions of the aircraft (e.g., air-speed, altitude, orientation (e.g., pitch, roll, or yaw), throttle settings, available battery power, known system failures, etc.), capabilities (e.g., maneuverability) of the aircraft under the current operating conditions, weather, restrictions on airspace, etc., to generate one or more paths that the aircraft is capable of flying under its current operating conditions. This may, in some embodiments, take the form of generation of an escape envelope 25 that defines the boundaries of a region representing a possible range of paths that aircraft 10 may safely follow. The escape envelope 25 (shown as a "funnel" shape) may be understood as the envelope or universe of possible avoidance maneuvers. This escape envelope may take any shape but generally widens at points further from the aircraft 10, indicative of the fact that the aircraft 10 is capable of turning farther from its present path as it travels. The aircraft monitoring system 5 may then select an escape path 35 within the escape envelope 25 for the aircraft 10 to follow in order to avoid the detected object 15.

In identifying an escape path 35, the aircraft monitoring system 5 may use information from sensors 20, 30 about the sensed object 15, such as its location, velocity, and/or probable classification (e.g., that the object is a bird, aircraft, debris, building, etc.). Sensors 20, 30 are capable of detecting objects anywhere within their field of view. As mentioned above, the sensors have a full or partial field of view all around the aircraft (not specifically shown) in all directions; the field of view is not limited to the escape envelope 25 illustrated in FIG. 1. Escape path 35 may also be defined such that the aircraft will return to the approximate heading that the aircraft was following before performing evasive maneuvers. As the aircraft 10 follows the escape path 35 and changes position, additional sensed information may be received through sensors 20, 30, and alternate escape paths, or changes to escape path 35, may be determined and/or followed based on an assessment of the additionally sensed information.

Figure 2:
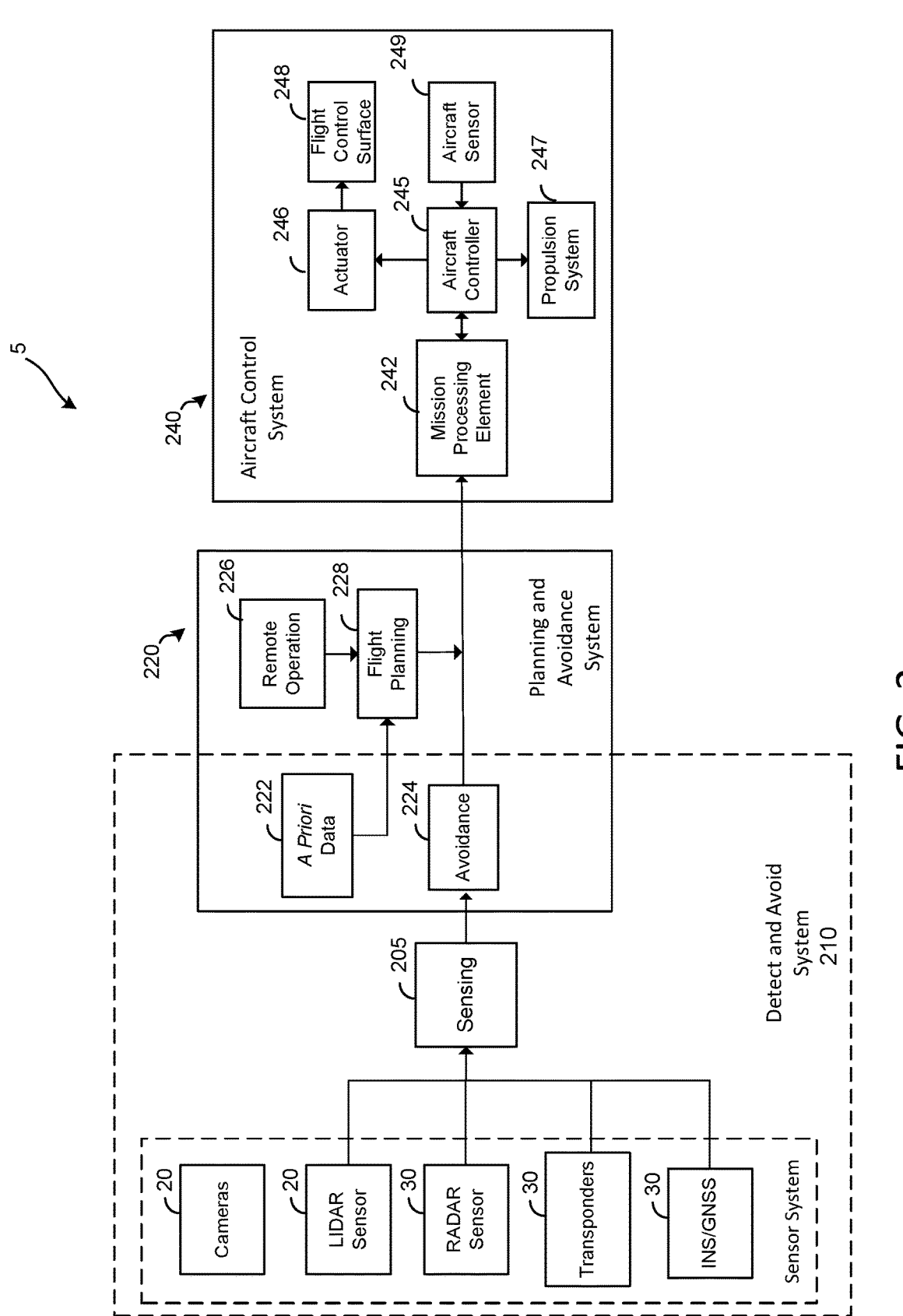
FIG. 2 is a block diagram of a portion of an aircraft monitoring system in accordance with some embodiments of the present disclosure.

FIG. 2 depicts select components of an exemplary aircraft monitoring system 5 that may be installed on an aircraft, including one or more sensors 20, one or more sensors 30, a sensing system 205, a planning and avoidance system 220 (that may include, e.g., an avoidance system 224 and a flight planning system 228, among other components), and an aircraft control system 240 that may include, e.g., a mission processing element 242, an aircraft controller 245, a propulsion system 247, and one or more actuators 246, among other components. Components of the aircraft monitoring system 5 may reside on the vehicle 10 or may be housed in a different location while being communicably accessible to other components. Components of the system 5 may communicate with each other through wired (e.g., conductive) and/or wireless (e.g., wireless network or short-range wireless protocol, such as Bluetooth) communication, however alternate implementations may be used in different embodiments.

The components shown in FIG. 2 are merely illustrative, and the aircraft monitoring system 5 may comprise various components not depicted for achieving the functionality described herein and for generally performing collision threat-sensing operations and vehicle control. Similarly, although particular functionality may be ascribed to various components of the aircraft monitoring system 5 as discussed herein, it will be understood that in other alternate embodiments, such functionalities may be performed by different components, or by one or more components.

A combination of some components from the sensors 20, 30, the sensing system 205, and the planning and avoidance system 220 function together as a "detect and avoid" element 210. The detect and avoid element 210 may perform processing of sensor data (as well as other data, such as flight planning data (e.g., terrain and weather information, among other things) and/or data received from aircraft control system 240 regarding an escape envelope) to generate an avoidance recommendation (or advisory) for an action to be taken by the aircraft controller 245. Data in support of this avoidance recommendation may be sent from the sensing system 205 to an avoidance element 224 (of planning and avoidance system 220), which applies one or more avoidance algorithms thereto to generate an optimized escape path. In some embodiments, one such algorithm (e.g., an Airborne Collision Avoidance System (ACAS) such as ACAS X, or Daedalus) may be directed to avoiding encounters with airborne aircrafts. In some embodiments, the avoidance algorithm may be deterministic in nature. The avoidance element 224 may, in some embodiments, employ a machine learning algorithm to classify and detect the location of an object 15 in order to better assess its possible flight performance, such as speed and maneuverability, and threat risk. In this regard, the system 5 may store object data that is indicative of various types of objects, such as birds or other aircraft that might be encountered by the aircraft 10 during flight, and may identify and/or classify sensed objects. It is possible to identify not just categories of objects (e.g., bird, drone, airplane, helicopter, etc.) but also specific object types within a category.

The avoidance algorithm(s) may, in some embodiments, also consider information from flight planning system 228. Such information may include, for example, a priori data 222, e.g., terrain information about the placement of buildings or other known static features, information about weather, airspace information, including known flight paths of other aircrafts (for example, other aircrafts in a fleet), and/or other relevant predetermined (or pre-discoverable) information. Such information may also include remote operation data 226, which may include information received from remote systems (e.g., air traffic control, operator information, etc.).

The planning and avoidance system 220 may provide its generated path information and/or other signals to the mission processing element 242 of aircraft control system 240. As one example of many, the planning and avoidance system may generate an escape action such as "climb at 500 ft/min and maintain regime until an advisory alert is turned off," though any appropriate type of escape path or action may be used. The escape path or action may, in some embodiments, be passed as an advisory to an aircraft control system that implements the advisory by controlling, as an example, the speed or direction of the aircraft, in order to avoid collision with the sensed object, to navigate the aircraft to a desired location relative to a sensed object, or to control the aircraft for other purposes. In some embodiments, the aircraft controller 245 may perform suitable control operations of the aircraft 10 by providing signals or otherwise controlling a plurality of actuators 246 that may be respectively coupled to one or more flight control surfaces 248, such as rudders, ailerons, elevators, flaps, spoilers, brakes, or other types of aerodynamic devices typically used to control an aircraft. Although a single actuator 246 and a single flight control surface 248 are depicted in FIG. 2 for simplicity of illustration, any practical number of actuators 246 and flight control surfaces 248 may be implemented to achieve flight operations of aircraft 10. The propulsion system 247 may comprise various components, such as engines and propellers, for providing propulsion or thrust to the aircraft 10. One or more aircraft sensors 249 may monitor operation and performance of various components of the aircraft 10 and may send feedback indicative of such operation and performance to the aircraft controller 245. In response to the information provided by the aircraft sensor 249 about performance of the systems of the aircraft 10, the aircraft controller 245 may control the aircraft 10 to perform flight operations.

It will be understood that the aircraft controller 245 is a reactive system, taking in the recommendation of the detect and avoid system 210 and reacting thereto. In response to receiving the recommendation, the mission processing element 242 may be configured to provide a signal to aircraft controller 245 to take an action in response to the threat, such as providing a warning to a user (e.g., a pilot or passenger) or controlling the aircraft control system 240 (e.g., actuators 246 and the propulsion system 247) to change the velocity (speed and/or direction) of the aircraft 10. As an example, the aircraft controller 245 may control the velocity of the aircraft 10 in an effort to follow an escape path 35, thereby avoiding a sensed object 15. Alternatively, the aircraft controller 245 may navigate to a desired destination or other location based on the sensed object 15.

The various components of the aircraft monitoring system 5 may be implemented in hardware or a combination of hardware and software/firmware. As an example, the aircraft monitoring system 5 may comprise one or more application-specific integrated circuits (ASICs), field-programmable gate arrays (FPGAs), and/or microprocessors programmed with software or firmware, or other types of circuits for performing the described functionalities. Systems 210, 220, and 240, may in some embodiments be implemented on discrete computing hardware and/or software, or in alternate embodiments, some components may be implemented with the same computing hardware or may share processors or other resources. Any appropriate configuration may be used, for example based on considerations such as weight and power consumption, communication latency, processing and/or computational limitation, or varying safety requirements for different systems.

Figure 3:
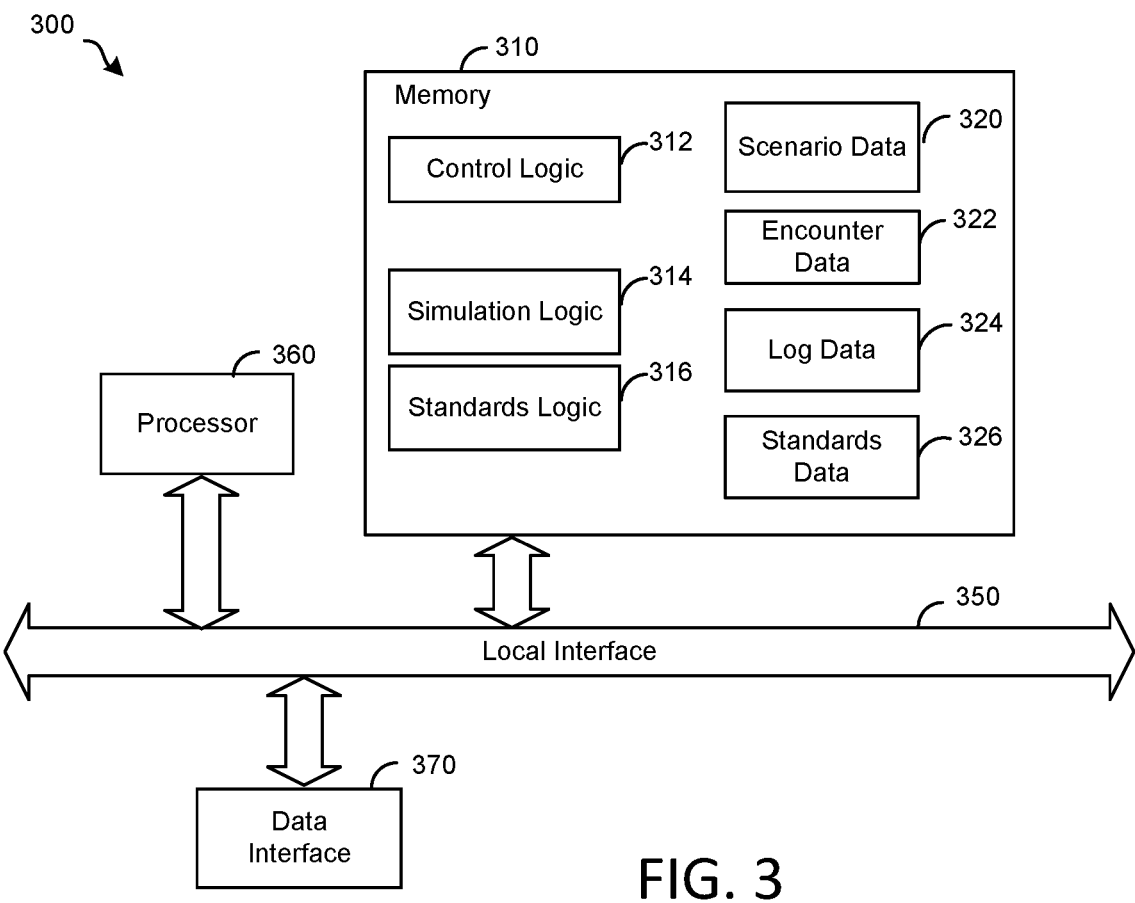
FIG. 3 is a diagram of an architecture of a simulation system 300 in accordance with some embodiments of the present disclosure.

FIG. 3 depicts an example schematic diagram of certain components of a simulation system 300 in accordance with some embodiments of the present disclosure. Simulation system 300 may be understood as a flight safety testing system for testing the performance, accuracy, and/or efficiency of the software stack used by the aircraft monitoring system 5. That is, the group of software (variously executed by systems 210, 220, and 240) that functions together to obtain and process sensor data from sensors 20, 30 to recognize an object or other conditions for collision, apply one of more avoidance algorithms to generate avoidance recommendations, and to act upon those recommendations to control the aircraft 10 can be separately tested in a simulated environment that does not require actual flight or other operation of the mechanical components of aircraft 10. Simulation system 300 may be used to run a large number of generated scenarios that reflect challenges or goals that an aircraft 10 might experience during flight. As described below with reference to FIGS. 3 through 6, system 300 retrieves all or a subset of reference scenarios stored in a database, and for each reference scenario, generates a large variety of kinematic, geographic, weather, mechanical, and/or fault conditions, each variation representing an "encounter". The sum of the encounters are designed to constitute a statistically representative set for a particular reference scenario. The generation of the conditions follows, in the exemplary embodiments, a stochastic approach, so as to achieve a large representative sample of possible conditions for the aircraft 10 within the reference scenario. Each of the one or more encounters, for each of the one or more reference scenarios, is run in the software stack of aircraft monitoring system 5, generating output data that reflects the performance and the behavior or the aircraft monitoring system 5 in all the scenarios. This process of simulation system 400 is a data driven solution to validate and verify the functions of the aircraft monitoring system 5 for various levels of certification, providing a means of compliance to safety standards or requirements issued by relevant certification agencies such as the FAA and EASA, or the like.

In the exemplary embodiment of FIG. 3, simulation system 300 is physically and/or logically separated from the various components of aircraft monitoring system 5 into different computing hardware (e.g., onto different printed circuit boards (PCBs) or onto independent processing units), in whole or in part. In such embodiments, the system 300 may communicate with such components via a data interface 370 (e.g., ports or pins). In other embodiments, systems 300 and the components of aircraft monitoring system 5 (or any subset thereof) may be housed on one or more shared hardware and/or may share the capabilities of one or more processing units. The simulation system 300 may be implemented in hardware, software, firmware or any combination thereof.

Processing of data in simulation system 300 may be implemented via one or more processors 360. The processor 360 may include any of a central processing unit (CPU), a digital signal processor (DSP), a graphics processing unit (GPU), an FPGA, an ASIC, or other types of circuits or processing hardware, or any combination thereof. Further, the processor 360 may include any number of processing units to provide faster processing speeds and/or redundancy, such processors being local and/or geographically distributed. System 300 may also have access to one or more shared memories or data repositories, shown in FIG. 3 as memory 310. While the term "database" or "repository" is used herein, such structures variously may be, e.g., a cache, database, other data structure or any suitable type of repository. Memory 310 may be any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor 360. While FIG. 3 illustrates a single discrete memory 310, the embodiments described herein are not limited to any particular arrangement and other embodiments may store information in one combined memory, or with information stored in a different configuration in one or more memories, some local to the other components illustrated in FIG. 3 and/or some shared with, or geographically located near, other computing systems. In some instances, memory 310 may be safety-of-life certified, though other configurations are possible in other embodiments.

In addition, memory 310 may store instructions or logic for implementing the functions of the simulation system 300, which logic may be implemented in hardware, software, firmware, or any combination thereof. The illustrated system 300 depicts a number of modules stored in memory 310, including control logic 312, simulation logic 314, and standards logic 316. These depicted modules may variously represent one or more algorithms, computational models, decision making rules or instructions, or the like implemented as software code or computer-executable instructions (i.e., routines, programs, objects, components, data structures, etc.) that, when executed by one or more processors 360, program the processor(s) to perform the particular functions of their respective logic. These modules are depicted in FIG. 3 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof.

The simulation system 300 may include control logic 312, including one or more algorithms or models for generally controlling the operation of the system 300. The control logic 312 may also, in one embodiment, include communication logic, such as one or more algorithms or models for obtaining information from or communicating information to one or more components of the aircraft monitoring system 5 (FIG. 2). Local interface 370 and control logic 312 may also be used (by, e.g., simulation logic 314 and standards logic 316) to communicate over one or more networks.

Simulation logic 314 (described further herein) may contain one or more algorithms or models to generate a set of reference scenarios, generates a variety random conditions (each unique variation of conditions being referred to herein as an "encounter"), and run those encounters in the software stack of aircraft monitoring system 5. In this regard, simulation logic 314 may, in some embodiments, read and/or write data to one or more databases in memory 310 containing scenario data 320. Scenario data 320 stores information reflective of a set of reference series. In an exemplary embodiment, the reference scenarios are predetermined or predefined by one or more entities managing the simulation system 300. In some embodiments, the reference scenarios may be obtained or derived from a set of safety standards or conditions set by a third-party system, such as an appropriate regulatory agency. A reference scenario is reflective of a challenge or goal to be addressed or handled by the aircraft monitoring system 5. In some embodiments, the reference scenario may additionally or alternately reflect a mission to be performed by the aircraft (e.g., a takeoff and landing point, cargo to be conveyed, etc.) In some embodiments, the challenge or goal may be relatively high-level, as just one example, an aircraft or object approaching from the left of aircraft 10. Of course, the foregoing is merely exemplary, and any appropriate scenario may be applied. In some embodiments, a plurality of discrete sets of scenarios may be defined and stored in scenario data 320, each set corresponding to a different set of regulatory standards. In some embodiments, such regulatory data may be maintained in memory 310 as standards data 326.

Memory 310 may additionally store encounter data 322. In an exemplary embodiment, memory 310 may include one or more state variables representing different conditions that may occur within the environment of a simulated encounter for aircraft 10. In one embodiment, encounter data 322 is stored in a cache, and is updated or overwritten as new random condition data is generated, and/or as condition data changes over the course of the execution of an encounter by the software of the aircraft monitoring system 5. An encounter in encounter data 322 may be reflected by a series of vectors reflecting conditions reflecting, for example, kinematic factors (position, speed, altitude, direction) of the aircraft 10 and/or one or more objects or aircrafts, weather (temperature, precipitation, light, visibility), time of day, geographic or topological conditions (e.g., terrain or buildings that are within the flight space of the aircraft 10), hardware (e.g., sensor or device types on the aircraft 10, the type of aircraft 10), points of failure on aircraft 10 (e.g., failures of hardware, software, communication, flight control surfaces), points of failures outside of aircraft 10 (e.g., failures by air traffic control, malicious interference by third-party entities), or any other factors that may affect the ability of the aircraft 10 to sense and/or process data and respond accordingly. In some embodiments, an encounter may include one or more commands or event data that may be recognized by one or more components of system 5 (and/or at one or more timestamps) during the process of execution of the scenario.

Each set of condition data defining an encounter in encounter data 322 is associated with information sufficient to identify a reference scenario in scenario data 320 (e.g., an identifier, unique character string, or the like). Reference scenarios and encounters are associated in a one to many or one to one relationship, that is, under a particular umbrella scenario in scenario data 320, one or more (in some embodiments, hundreds or thousands) of randomized condition variations are generated and stored, each variation being stored as an encounter data set 322, as unique encounters that can be processed by the simulation architecture. The variations are generated in a stochastic manner, from among a range of possible values for different conditions, thereby having a random probability distribution or pattern that may be analyzed statistically but may not be predicted precisely.

Standards logic 316 (described further herein) may contain one or more algorithms or models to generate logs or records from the execution of the encounters in encounter data 322 by the simulation logic 314. Such logs may be stored, in memory 310 as log data 324. Log data 324 may comprise, for instance, information sufficient to identify, in association with their respective timestamps, changes in position or kinematic data for each of the aircraft 10 and one or more objects or other physical bodies encountered during the execution of the encounter. In some embodiments, log data 324 may also include information about the condition of various components of the aircraft 10 (e.g., damage or failures), information about the flight conditions on the cargo (e.g., people or items), such as the G-force applied, the steepness or suddenness of the movements of the aircraft 10, and/or other relevant information. Standards logic 316 may generate metrics based on log data 324, aggregating the data within at a scenario-level (viz., for each scenario), or across a set of scenarios. The generated metrics may reflect, for instance, the performance of the aircraft monitoring system 5 in maintaining separation from other aircrafts or objects, a speed of response, a computation speed, and any other appropriate benchmark for measurement. Standards logic 316 may also acquire data from standards data 326 that may compared to the generated metrics to determine whether the performance of the aircraft monitoring system 5 across the set of applied scenarios met one or more safety standards.

Figure 4:
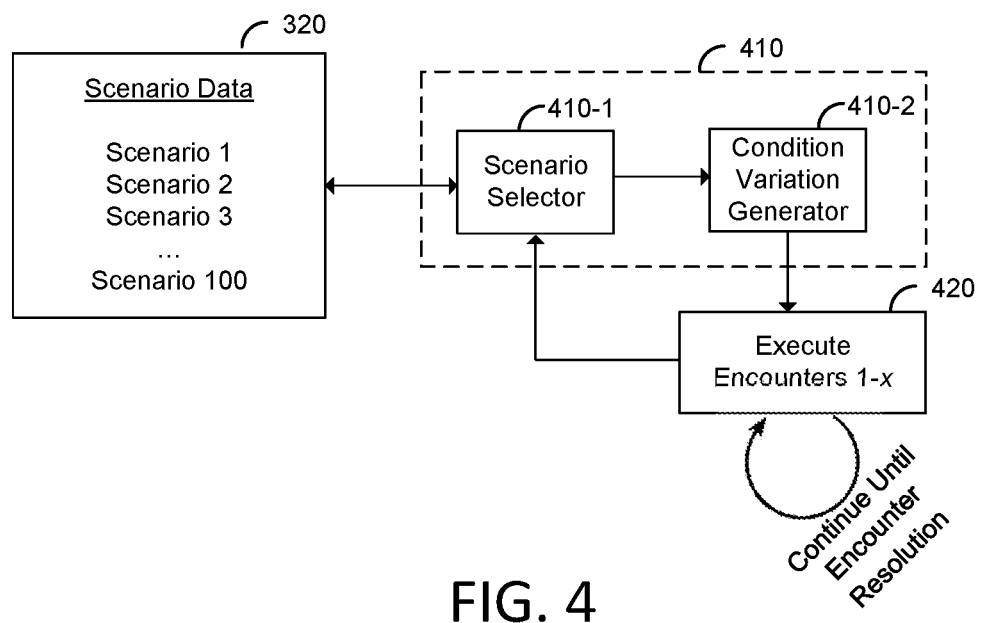
FIG. 4 is a diagram of a process of iterative simulation testing in accordance with some embodiments of the present disclosure.
Figure 5:
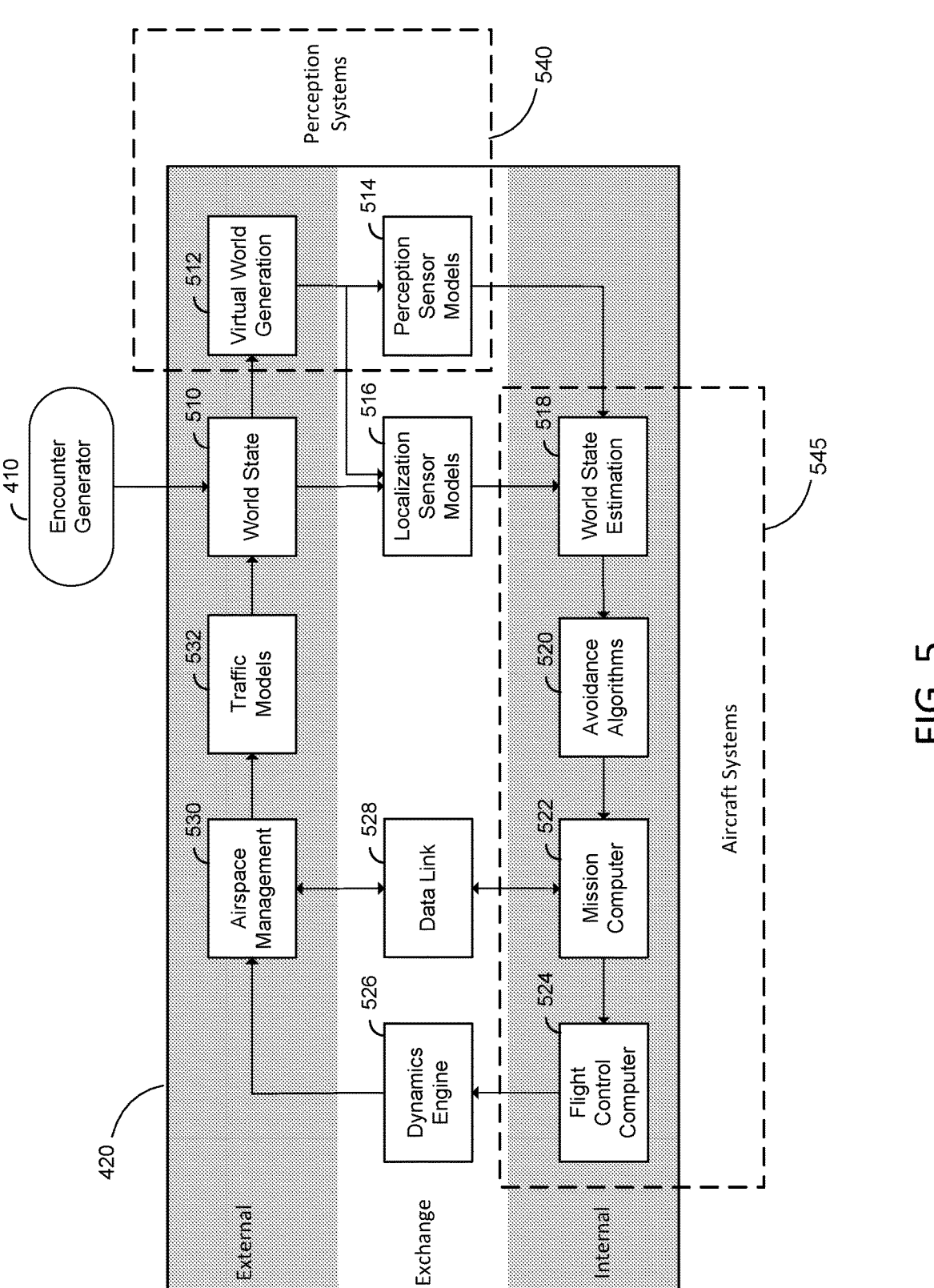
FIG. 5 is a diagram of a simulation system architecture in accordance with some embodiments of the present disclosure.

FIGS. 4 and 5 illustrates an exemplary mechanism used by simulation logic 314 to perform its simulation testing. While FIGS. 4 and 5 reflect certain configurations of logical processes performed by the simulation logic 314, the individual boxes reflected in these figures do not necessarily reflect discrete algorithms, and instead are illustrated to generally explain the processing of data by the simulation logic 314. Other configurations may be possible in other embodiments.

FIG. 4 illustrates an encounter generator 410 that includes a scenario selector component 410-1 and a condition variation generator 410-2. Scenario selector component may select a scenario to test from a set of predefined scenarios in scenario data 320. In an exemplary embodiment, this is a non-random selection, and instead, selections may be performed serially through each of the one or more scenarios stored in the scenario data 320, or a subset thereof. Where computing resources permit, it is possible for more than one scenario to be processed in parallel by simulation logic 314 against identical software stacks. In some embodiments, scenario selector 410-1 may also function to generate scenario data based on information stored in standards data 326. FIG. 4 illustrates a selection of one of scenarios 1-100, though any non-zero number of reference scenarios may be used in other embodiments. Vector information reflective of the selected scenario is passed to condition variation generator 410-2, which functions to generate, on a random basis, a number x of variations of that scenario (e.g., 1000 variations, though any number may be used), each deviating slightly from each other while still meeting the defined goals/challenges of the scenario. The variations may reflect, e.g., kinematic condition randomizations, weather or temperature randomization (e.g., positions of clouds), precipitation, light variations (the direction and source of lights), time of day (daytime/nighttime), geographic conditions, type of vehicle(s), types and/or intelligence of objects encountered, sensor condition(s) and type(s), and/or points of failure (including hardware failures) within the system, or any factor that can positively or negatively affect the sensor RADAR models, instrumentation, or other aircraft conditions. Condition variation generator 410-2 generates these conditions on a random basis, and accordingly, creates a set of varied encounters within the scenario that make up a statistically representative set of sample conditions in which aircraft 10 might operate.

Condition variation generator 410-2 generates a series of vector information for each variation, also referred to herein as encounter data though it is not limited to variation where the aircraft experiences a simulated encounter with one or more objects, and passes that information to an execution component 420, which functions in the manner shown in FIG. 5 to process that data in an iterative manner (described in greater detail below) until the conditions of the encounter have been addressed or resolved. In other embodiments, execution component 420 may continue to process the data in an iterative manner until a predetermined amount of time has passed, or until a set amount of time has passed without any environmental condition change. The vector information may represent one or more environmental state values, each representing a condition that makes up a virtual world. As each iteration of process is passed, the environmental state values are updated (e.g., to reflect updated position data, weather data, aircraft condition data, and the like).

When execution component 420 completes its processing of an encounter, condition variation generator 410-2 provides information from the next of its generated encounters, looping through each of the x (here, 1000) generated encounters within the selected scenario. The process then steps back to scenario selector 410-1, which selects the next scenario from scenario data 320 and passes such information to condition variation generator 410-2. The process continues until all varied encounters of all intended reference scenarios have been processed. The results of each encounter are logged (not shown). Put another way, scenario selector 410-1 functions to select a seed scenario and condition variation generator 410-2 defines encounters to try that seed scenario out in a representative set of "all" possible conditions. In some embodiments, condition variation generator 410-2 may apply a Monte Carlo simulation technique to generate encounters reflecting all or most of the potential outcomes of the selected scenario when applied to the aircraft's mission (typically, navigating to and/or landing safely at a desired destination though other missions may be used in other embodiments). This solution is far more comprehensive than an actual flight testing of aircraft 10, which would require an infinite amount of time to determine the resolution of the scale of conditions generated by the encounter generator 410.

As just one example, a Scenario 1 in scenario data 320 may reflect an aircraft approaching aircraft 10 from the left. Condition variation generator 410-2 may generate, for example, encounters with randomly varied position, speed, or aircraft type data of the approaching aircraft or of aircraft 10 (randomly varied from within the respective ranges of possible positions, speeds, types), maintaining the umbrella condition of Scenario 1 that the aircraft is approaching from the left. Condition variation generator 410-2 may additionally or alternately randomly vary specific conditions of environmental data, communication data, and/or failure data. In other embodiments, scenarios may be more limited in scope. As just one example of a narrower scenario, a Scenario 2 in scenario data 320 may reflect that an object is approaching from a 45 degree, from the right, at 100 knots, at an altitude of 1000 ft. In another embodiment, a Scenario 3 may reflect that aircraft 10 takes off from a certain geographic location, with a payload of one person, and encounters, at a certain timestamp, a Cessna aircraft 2 km from the right side of aircraft 10. As yet another example, a Scenario 4 may reflect an encounter with a bird, and condition variation generator may randomly generate, for instance, the number and position of each respective bird, within a predefined range of, e.g., 1-20 birds, a predefined range of sizes, a predefined range of altitudes, etc. Of course, the foregoing is merely exemplary and is intended to reflect the variety in scope that may be defined by the encounter generator 410.

FIG. 5 is a block diagram illustrating an exemplary iterative processing of an encounter by execution component 420. While different configurations may exist in different embodiments, the exemplary FIG. 5 illustrates an internal layer (made up of components internal to the functioning of the aircraft 10), an external layer (made up of components simulating effects on the environment external to the aircraft 10), and an exchange layer (made up of components simulating the effects of the external and internal layers on each other). In general, activity in the external and exchange layers are simulated activities performed by the simulation logic 314, and activity in the internal layer are simulated activities performed by the software of the aircraft monitoring system 5.

As described above, encounter generator 410 creates a series of vectors defining an encounter that sets the initial conditions of where objects are in the simulated environment, including the position, altitude, velocity, and other conditions of aircraft 10 (viz., kinematic and dynamic conditions), and other conditions as described above describing the state of all objects. This information is passed to world state 510, which transforms the vector information to a series of parameters (e.g., (x, y, z) parameters that describe the state of the aircraft 10, and of any other object or aircraft in the environment). Depending on the encounter characteristics, one or more objects in the virtual environment may be intelligent aircrafts and/or vehicles or objects (also referred to as "cooperative objects") capable of communicating with the aircraft monitoring system of aircraft 10. For example, the objects may be capable of broadcasting signals (e.g., through ADS-B technology) indicating the object's flight path. Localization sensor models 516 generate such received data localizing the other objects in the virtual world. This received data is passed to world state estimation 518 (described below).

Virtual world generation 512 and perception sensor models 514 may be understood together as perception systems 514, which functions to generate synthetic data about what the sensors 20, 30 (e.g., cameras, RADAR) of aircraft 10 would be sensing. These sensed data may include, for example, position information about sensed objects along with timestamps. More particularly, virtual world generator 512 takes in parameter data from world state 510 as mathematically described, and creates a projection of images seen by the image sensor 20, 30. In an exemplary embodiment, virtual world generator 512 can be understood to create "perfect" unencumbered sensor data, outputting a projection of sensed images and/or radar return, reflecting the position of a sensed object(s) within an image frame, considering the position of sensor with respect to the aircraft 10 and other known objects. Perception sensor models 514 may be generally understood to add real-world effects to the sensor data to create a more representative set of imagery and raw sensor data. This may involve, for instance, adding noise, distortions, and other imperfections to the data. In some embodiments, the imperfections applied by the perception sensor models 514 may depend on the type of sensors (e.g., type of camera, type of lens) and/or weather conditions set by the encounter data. The output of perception systems 240 is synthetic sensor data (or simulated sensor data), such as image data or raw radar data, modelled to be imperfect, which data is fed into aircraft systems 545.

Components 518 and 520 of aircraft systems 545 may be understood as the actual software systems of aircraft monitoring system 5 (FIG. 2) and the processing algorithms implemented by that system, that is, the software stack to be tested. Components 522 and 524 represents simulated aircraft systems with which the monitoring system interact. World state estimation 518 may include one or more perception algorithms that can take in the output of the perception systems 540 and the output of the localization sensor models 516, and generate a representation of where all the objects in environment surrounding aircraft 10 are positioned and their expected direction and speed of movement. In some embodiments, world state estimation 518 may be understood as sensing system 205 of aircraft monitoring system 5 (FIG. 2). Based on this information (vector and position data), avoidance algorithms 520 (performed, e.g., by avoidance element 224 in FIG. 2) generate recommendations for paths and/or maneuvers to avoid collision with any sensed objects. The avoidance logic may take into consideration a variety of information, such as flight planning data, weather data and other condition data. The avoidance algorithms 520 may, by themselves or in combination with other components of the aircraft systems, validate the position and vector data sent by world state estimation 518. In some embodiments where the encounter data specifies a payload on the aircraft (e.g., passengers), the avoidance logic would consider the effects of its actions on such payload, in, e.g., how steep of turn or how much acceleration is recommended (the smoothness of the action), depending, e.g., on the urgency of the action (ranging from preventative to immediate action). The avoidance algorithms 520 then provide a flight path (recommendation or advisory) to the mission computer 522.

Traditionally (as shown in FIG. 2), avoidance systems 224 do not take control of the aircraft 10, the actuators 246, or the propulsion systems 247. Rather, they provide a recommendation of an action that the aircraft control system 240 should take. This recommendation information is sent to mission processing element 242 (corresponding in FIG. 5 to mission computer 522) to compute an optimized path, which is ultimately passed to the aircraft controller 245 (corresponding in FIG. 5 to flight control computer 524). The aircraft controller 245 may then control the actuators and propulsion of the aircraft in accordance with the recommendation. In the simulation, no actual manipulation of the aircraft 10, the actuators 246, or the propulsion systems 247 is performed; instead, such actions are simulated. In particular, the functioning of the aircraft systems may process the recommendation(s) of avoidance algorithms 520 through mission computer 522 and flight control computer 524 to send commands to aircraft 10 within the simulation, modifying the position and/or condition of the aircraft 10 with respect to any other objects. Mission computer 522 may, as part of the normal avoidance operation, attempt to interact with other entities via data link 528, such as an air traffic management (ATC) system, one or more sensed aircrafts, and/or other computing and communication systems, and such interactions may be processed and transmitted to airspace management 530.

Based on the actions of the aircraft systems 545, and the corresponding positional, status, and/or communication changes made by the components therein, the relative positions and status of the other objects in the virtual world may correspondingly change. For instance, as flight control computer 524 changes the position of the aircraft 10, dynamics engine 526 generates resultant position data of the other objects in the virtual world, and sends such data to airspace management 530. Airspace management 530 communicates the sum picture of the airspace to traffic models 532, which simulates any course changes of the aircraft 10 and/or the objects in world that change their course. The world state 510 is then updated in view of such information, and execution component 420 repeatedly loops over elements 510-532 for the entirety of encounter. When the encounter is satisfied, then the simulation may be ended when the process next returns to the update of the world state 510. In an exemplary embodiment, the goal of the encounter may be limited (e.g., collision is avoided) and therefore, the entire process of satisfying the encounter may take only, for example, a few minutes. In other embodiments, the goal may be larger (e.g., simulation of an entire flight) and may take longer to be satisfied. In still other embodiments, the encounter data may not contain a specific goal, and instead, execution component 420 may continue to iterate over elements 510-532 with updated environmental state information until a predetermined amount of time has passed, or until a set amount of time has passed without any environmental condition change.

The encounter data, while shown in FIG. 5 to feed into the world state 510 and localization sensor models 516, may contain data about the state of all the elements of execution components 420, and the different elements of the execution component 420 may be variously impacted by the encounter data fed therein. As just one example, the encounter data may include command data that does not affect sensor output but would affect the functioning of another component, such as the data link 528 (e.g., limiting the availability of towers around aircraft 10). Encounter data may also include conditions or command data that restrict certain actions by the aircraft systems 545. As just one example, the encounter data may limit (e.g., through topological conditions, weather conditions, or hardware conditions), where the aircraft may land.

In some embodiments, the encounter data may include or introduce event data to simulate failure scenarios, including hardware failures. In the exemplary embodiment, the range of variations generated by condition variation generator 410-2 would include encounters involving failure of every key point in aircraft monitoring system 5 and/or every hardware, communication, or architectural component of aircraft 10 (e.g., one or more cameras, motors, etc.), or any combination thereof. Additionally, the encounter data may include event data to simulate false or malicious communications (adversarial messages), loss of communication with airspace management, or to simulate delay or disruption of communication between components of aircraft systems 545 (as one example, a delay of x seconds on mission computer 522). In some embodiments, an encounter may be unresolvable, and the execution component 420 may simply function to log what aircraft monitoring system 5 will do in response to the conditions of the encounter.

From the above, it may be understood that two general types of data may be included in the encounter data: condition data that is extant at the beginning of the execution process 420 (e.g., kinematic data, weather data), and data that may be introduced at any point during the execution process 420 (e.g., command data for execution by different components, event data triggered at particular timestamps, locations/positions, or other conditions) that triggers the implementation of simulation code within the defined script of the encounter (such as an encounter, failure, external condition or the like experienced at some point in a mission). In an exemplary embodiment, conditions are given in terms of events at simulated times (viz., triggered at timestamps), and the timestamps may be generated during the iterative process of components 510-532 based on a probability of the event's occurrence given the current world state at that point in the simulation. That is, an event may not become possible or probable until and unless the world states are altered during the iterative execution of the encounter, and the code for the simulation of that event may be triggered by the change of state to possibility rather than a particular timestamp.

Standards logic 316 functions to generate logs or records from the execution 420 of the encounters. The logged data may include changes in position or kinematic data for each of the aircraft 10 and one or more objects or other physical bodies encountered during the execution of the encounter. Each change in position may be logged in association with a timestamp of change. Such logs may be stored in memory 310 as log data 324. In some embodiments, the logged data may also include information about the condition of various components of the aircraft 10 (e.g., damage or failures), information about the flight conditions on the cargo (e.g., people or items), such as the G-force applied, the steepness or suddenness of the movements of the aircraft 10, and/or other relevant information. In some embodiments, all of the information that is fed into the world state 510 at the completion of one iteration of the execution component 420 is logged, in association with relevant timestamp data. The logged data is also stored in association with the particular unique encounter that was run (identified in some instances by a unique encounter identifier in encounter data 322). After all of the randomly-generated encounters are run for all of the scenarios, the data can be aggregated at various levels of granularity. For instance, standards logic 316 may generate metrics using the logged data at a scenario-level, that is, for the aggregate all of generated encounters associated within a referenced scenario. In some embodiments, metrics may be generated across a set of scenarios, that is, the generated scenario-level metrics can be aggregated for analysis across all of a subset of the scenarios stored in scenario data 320. In some embodiments, metrics can be generated for only encounters meeting criteria within one more scenarios. As one example, metrics may be generated across multiple scenarios specific to encounters where a communication link was inactive or compromised, regardless of whether the respective high-level reference scenario mandated such a condition. The various generated metrics may reflect the performance of the aircraft monitoring system 5 in maintaining separation from other aircrafts or objects (e.g., distance of avoidance), a speed of response, a computation speed, degrees of difference between the system's performance a minimum standards performance, and/or any other appropriate benchmark for measurement. These metrics can be used by standards logic 316 to draw overarching conclusions about the performance of the aircraft monitoring system 5. For instance, it may determine whether the system 5 met one or more sets of regulatory standards data 326. In addition, rather than a binary meet/fail determination, standards logic 316 may performance comparative calculations to assign numeric scores to the performance of the system 5 with reference to any preset benchmarks. As one example, standards logic 316 may determine, for a given reference scenario, the minimum closest distance necessary to avoid collision with a sensed object, and a difference between the simulated performance and the minimum distance. As another example, the simulation system 300 would be able to generate statistical values indicating that certain benchmarks were met in a certain percentage of cases. Such a scoring system can be used to verify whether the system meets or exceeds performance requirements, to appraise or assess performance improvement or degradation of a learning system, and/or to validate the actions taken by aircraft monitoring system 5.

In one embodiment, the standards logic 316 may use the generated metrics to compare the actions of the aircraft monitoring system 5 against one or more defined safety standards. Such safety standards may vary based on risk factors and their respective thresholds provided by regulatory associations, a type or class of vehicle, the number of people conveyed by the vehicle, the geographic location of flight, or any other relevant consideration. In one embodiment, the safety standards may be based on or derived from classifications used by certification authorities, e.g., the Design Assurance Levels (DALs) "A" through "E", each level being respectively less stringent. The standards logic 316 may in some embodiments function to confirm that one or more components of the aircraft monitoring system 5 are certificatable to a high safety standard, under any relevant regulations. The standards logic 316 may confirm that software components of aircraft monitoring system 5 and/or and other components, including sensors, that the software relies upon or receives information from, would be certificatable under an appropriate safety standard. Because such standards may be modified over time, growing more or less stringent or adding additional tests, standards logic 316 may communicate with one or more third party systems via data interface 370 to consistently updated standards information. Simulation system 300 may generate additional reference scenarios in view of updated standards. By these means, simulation testing can be efficiently performed for different standards of safety that may be applicable in different geographic locations, for different types of aircrafts, at different altitudes, etc.

Figure 6:
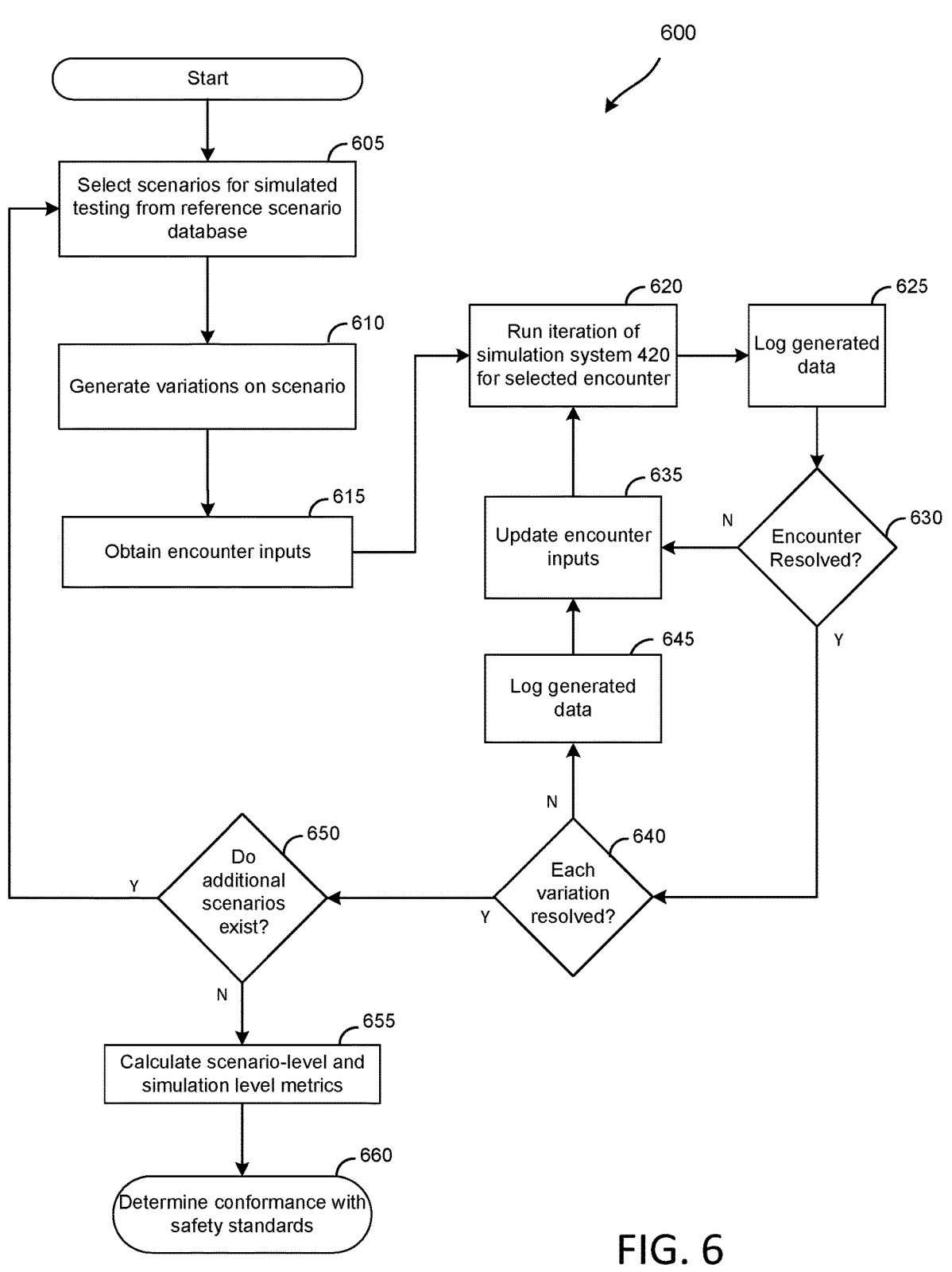
FIG. 6 is a flow chart of a method for iterative simulation testing in accordance with some embodiments of the present disclosure.

FIG. 6 illustrates an exemplary process 600 in which the simulation system 300 may function. Encounter generator

410 generates or obtains from a database a set of reference scenarios. All or a selected subset of scenarios may be used for testing, that testing being done serially through an individual selection of a reference scenario from the database in step 605. Encounter generator 410, using the selected scenario, randomly varies the environmental conditions within the confines of the scenario, generating a plurality of variations (encounters) in step 610. In step 615, the execution component 420 obtains a set of vectors representing encounter inputs, and runs one iteration of the software stack of the aircraft monitoring system 5 using the encounter inputs (step 620). Any changes in environment (position, aircraft state, airspace traffic, etc.) are logged in association with the timestamp at which the respective changes occurred (step 625). If the encounter is not resolved (No in step 630), the encounter inputs are updated with the relevant changes (step 635), and fed back into the software of the aircraft monitoring system 5 (step 620). This process (steps 620-635) continues in an iterative manner until the encounter is resolved (Yes in step 630). If additional variations exist within the selected scenario, that is, additional encounters have been generated that have not been tested (No in step 640), the conclusion of the scenario is logged (step 645). The encounter inputs are updated to reflect the wholly new encounter simulation (step 635) and the process returns to step 620 to execute the aircraft software with new environmental inputs. Once each variation has been cycled through (Yes in step 640), it is determined whether additional reference scenarios should be considered. If so (Yes in step 650) a new scenario is selected in step 605. If all relevant scenarios have been simulated (No in step 650), the logs are finalized and metrics may be generated in step 655 at one or both of a scenario level and a simulation level (e.g., across multiple scenarios). In some embodiments, these metrics can be used in step 660 to validate whether the aircraft software conforms to one or more defined safety standards.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for evaluating performance of a monitoring system of an aircraft in a simulated environment, the method comprising:

obtaining, from a memory, a reference scenario associated with the aircraft;

generating, for the reference scenario, a plurality of conditional scenario variations, each of the plurality of conditional scenario variations comprising a set of environmental state values relating to the simulated environment, wherein the environmental state values are randomly selected based on one or more ranges of possible values;

executing, for each of the plurality of conditional scenario variations, (a) generating, based on the set of environmental state values, simulated sensor data, (b) inputting, to the monitoring system, the simulated sensor data, (c) receiving, from the monitoring system, instructions for controlling the aircraft based on the simulated sensor data, (d) updating the set of environmental state values for the respective conditional scenario variation based on the received instructions, and (e) storing, in a memory, log data in accordance with the updated set of environmental state values;

generating metrics based on the log data stored for each of the plurality of conditional scenario variations, wherein at least one metric of the generated metrics characterizes a performance of the monitoring system in maintaining a threshold distance from a detected object external to the aircraft;

comparing the generated metrics to one or more predefined safety standards; and determining whether the monitoring system conforms to the one or more predefined safety standards based on the comparison.

2. The method of claim 1, wherein a conditional scenario variation of the plurality of conditional scenario variations is representative of an encounter with an object in the space around the aircraft, and wherein the steps (a) through (e) are iterated until the updated set of environmental state values indicate that the encounter has been resolved.

3. The method of claim 1, wherein the steps (a) through (e) are iterated until a predetermined amount of time has passed.

4. The method of claim 1, wherein a plurality of reference scenarios are stored in the memory, wherein the steps of obtaining, generating the plurality of conditional scenario variations, and executing steps (a) through (e) are performed for each of the plurality of reference scenarios in a serial manner, and wherein the generated metrics are aggregated to include metrics for each of the plurality of reference scenarios.

5. The method of claim 1, wherein the generated metrics are representative of the performance of the monitoring system of the aircraft with respect to one or more predefined safety standards.

6. The method of claim 1, wherein each of the plurality of conditional scenario variations comprises a plurality of vectors, each vector of the plurality of vectors representing a respective environmental state value.

7. The method of claim 1, wherein the simulated sensor data comprises data indicative of an object external to the aircraft, and wherein the data indicative of the object external to the aircraft includes position data and kinematic data of the object.

8. The method of claim 1, wherein the simulated sensor data comprises at least one of image data and RADAR data.

9. The method of claim 1, further comprising:

generating, for each of the plurality of conditional scenario variations, event data based on the set of environmental state values, and inputting, to the monitoring system, the event data.

10. The method of claim 9, wherein the event data comprises data simulating one or more of: a hardware failure condition, a communication failure condition, and a delay condition.

11. A simulation system for evaluating performance of a monitoring system of an aircraft in a simulated environment, the simulation system comprising:

a memory; and at least one processor coupled to the memory, the at least one processor being configured to execute instructions stored in the memory to perform steps comprising:

obtaining, from the memory, a reference scenario associated with the aircraft;

generating, for the reference scenario, a plurality of conditional scenario variations, each of the plurality of conditional scenario variations comprising a set of environmental state values relating to the simulated environment, wherein the environmental state values are randomly selected based on one or more ranges of possible values;

executing, for each of the plurality of conditional scenario variations, (a) generating, based on the set of environmental state values, simulated environment data, (b) inputting, to the monitoring system, the simulated environment data, (c) receiving, from the monitoring system, instructions for controlling the aircraft based on the simulated environment data, (d) updating the simulated environment data for the respective conditional scenario variation based on the received instructions, and (e) storing, in a memory, log data in accordance with the updated simulated environment data;

generating metrics based on the log data stored for each of the plurality of conditional scenario variations, wherein at least one metric of the generated metrics characterizes a performance of the monitoring system in maintaining a threshold distance from a detected object external to the aircraft;

comparing the generated metrics to one or more predefined safety standards; and determining whether the monitoring system conforms to the one or more predefined safety standards based on the comparison.

12. The simulation system of claim 11, wherein a conditional scenario variation of the plurality of conditional scenario variations is representative of an encounter with an object in the space around the aircraft, and wherein the steps (a) through (e) are iterated until the updated simulated environment data indicates that the encounter has been resolved.

13. The simulation system of claim 11, wherein the steps (a) through (e) are iterated until a predetermined amount of time has passed.

14. The simulation system of claim 11, wherein a plurality of reference scenarios are stored in the memory, wherein at least one processor performs the steps of obtaining, generating the plurality of conditional scenario variations, and executing steps (a) through (e) for each of the plurality of reference scenarios in a serial manner, and wherein the generated metrics are aggregated to include metrics for each of the plurality of reference scenarios.

15. The simulation system of claim 11, wherein the generated metrics are representative of the performance of the monitoring system of the aircraft with respect to one or more predefined safety standards.

16. The simulation system of claim 11, wherein each of the plurality of conditional scenario variations comprises a plurality of vectors, each vector of the plurality of vectors representing a respective environmental state value.

17. The simulation system of claim 11, wherein the simulated environment data comprises one or more of: simulated sensor data and event data.

18. The simulation system of claim 17, wherein the simulated sensor data comprises data indicative of an object external to the aircraft, and wherein the data indicative of the object external to the aircraft includes position data and kinematic data of the object.

19. The simulation system of claim 17, wherein the simulated sensor data comprises at least one of image data and RADAR data.

20. The simulation system of claim 17, wherein the event data comprises data simulating one or more of: a hardware failure condition, a communication failure condition, and a delay condition.

* * * * *